(12) United States Patent
Rizzo et al.

(10) Patent No.: US 9,052,829 B2
(45) Date of Patent: Jun. 9, 2015

(54) METHODS AND STRUCTURE FOR IMPROVED I/O SHIPPING IN A CLUSTERED STORAGE SYSTEM

(75) Inventors: James A. Rizzo, Austin, TX (US); Vinu Velayudhan, Fremont, CA (US); Adam Weiner, Henderson, NV (US); Basavaraj G. Hallyal, Fremont, CA (US); Gerald E. Smith, Niwot, CO (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 539 days.

(21) Appl. No.: 13/432,238

(22) Filed: Mar. 28, 2012

(65) Prior Publication Data

US 2013/0067123 A1 Mar. 14, 2013

Related U.S. Application Data

(60) Provisional application No. 61/532,585, filed on Sep. 9, 2011.

(51) Int. Cl.
| | |
|---|---|
| *G06F 3/00* | (2006.01) |
| *G06F 3/06* | (2006.01) |
| *G06F 13/12* | (2006.01) |
| *G06F 13/28* | (2006.01) |
| *G06F 13/42* | (2006.01) |

(52) U.S. Cl.
CPC .............. *G06F 3/0631* (2013.01); *G06F 13/12* (2013.01); *G06F 13/28* (2013.01); *G06F 3/0613* (2013.01); *G06F 3/0635* (2013.01); *G06F 3/0683* (2013.01); *G06F 2206/1012* (2013.01); *G06F 3/065* (2013.01); *G06F 3/067* (2013.01); *G06F 13/423* (2013.01); *Y02B 60/1228* (2013.01)

(58) Field of Classification Search
CPC ................... G06F 2212/7201; G06F 3/067
USPC ........................................... 710/22
See application file for complete search history.

(56) References Cited

U.S. PATENT DOCUMENTS

| | | | |
|---|---|---|---|
| 6,105,080 A * | 8/2000 | Holt et al. ................. | 710/26 |
| 6,487,646 B1 | 11/2002 | Adams et al. | |
| 6,651,154 B1 | 11/2003 | Burton et al. | |
| 6,738,870 B2 * | 5/2004 | Van Huben et al. ......... | 711/150 |
| 6,738,872 B2 | 5/2004 | Van Huben et al. | |
| 6,754,739 B1 | 6/2004 | Kessler et al. | |

(Continued)

OTHER PUBLICATIONS

"Common RAID Disk Data Format Specification" Version 2.0 Revision 19 SNIA Technical Position Mar. 27, 2009.

(Continued)

*Primary Examiner* — Titus Wong
(74) *Attorney, Agent, or Firm* — Duft Bornsen & Fettig LLP (57) ABSTRACT

Methods and structure for improved shipping of I/O requests among multiple storage controllers of a clustered storage system. Minimal processing of a received I/O request is performed in a first controller to determine whether the I/O request is directed to a logical volume that is owned by the first controller or to a logical volume owned by another controller. For requests to logical volumes owned by another controller, the original I/O request is modified to indicate the target device address of the other controller. The first controller then ships the request to the other controller and configures DMA capabilities of the first controller to exchange data associated with the shipped request between the other controller and memory of the host system.

19 Claims, 3 Drawing Sheets

(56) References Cited

U.S. PATENT DOCUMENTS

| | | |
|---|---|---|
| 6,944,785 B2 | 9/2005 | Gadir et al. |
| 7,058,846 B1 | 6/2006 | Kelkar et al. |
| 7,082,390 B2 * | 7/2006 | Bergsten ............... 703/21 |
| 7,213,102 B2 | 5/2007 | Buchanan, Jr. et al. |
| 7,418,550 B2 | 8/2008 | Hetrick et al. |
| 7,480,941 B1 | 1/2009 | Balasubramaniam et al. |
| 7,814,065 B2 | 10/2010 | Chan et al. |
| 7,971,094 B1 | 6/2011 | Benn et al. |
| 8,001,242 B2 | 8/2011 | Mild et al. |
| 8,041,735 B1 | 10/2011 | Lacapra et al. |
| 8,190,816 B2 | 5/2012 | Balasubramanian |
| 8,261,003 B2 | 9/2012 | Young et al. |
| 8,370,571 B2 * | 2/2013 | Mazina ............... 711/114 |
| 8,380,885 B1 | 2/2013 | Natanzon |
| 2002/0103964 A1 | 8/2002 | Igari |
| 2004/0148477 A1 | 7/2004 | Cochran |
| 2004/0205074 A1 | 10/2004 | Berkery et al. |
| 2005/0080874 A1 | 4/2005 | Fujiwara |
| 2005/0097324 A1 | 5/2005 | Mizuno |
| 2005/0125557 A1 | 6/2005 | Vasudevan et al. |
| 2005/0188421 A1 | 8/2005 | Arbajian |
| 2005/0240928 A1 | 10/2005 | Brown et al. |
| 2006/0080416 A1 | 4/2006 | Gandhi |
| 2006/0143506 A1 * | 6/2006 | Whitt et al. ............... 714/6 |
| 2007/0015589 A1 | 1/2007 | Shimizu et al. |
| 2007/0067497 A1 | 3/2007 | Craft et al. |
| 2007/0088928 A1 * | 4/2007 | Thangaraj et al. ............ 711/163 |
| 2007/0210162 A1 | 9/2007 | Keen et al. |
| 2009/0119364 A1 | 5/2009 | Guillon |
| 2009/0222500 A1 | 9/2009 | Chiu et al. |
| 2010/0185874 A1 | 7/2010 | Robles et al. |
| 2010/0191873 A1 | 7/2010 | Diamant |
| 2010/0250699 A1 | 9/2010 | Brown |
| 2010/0274977 A1 | 10/2010 | Schnapp et al. |
| 2011/0072228 A1 | 3/2011 | Nagata |
| 2011/0178983 A1 | 7/2011 | Bernhard et al. |
| 2011/0225371 A1 | 9/2011 | Spry |
| 2012/0159646 A1 | 6/2012 | Hong Chi et al. |
| 2012/0216299 A1 | 8/2012 | Frank |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

METHODS AND STRUCTURE FOR IMPROVED I/O SHIPPING IN A CLUSTERED STORAGE SYSTEM

BACKGROUND

1. Field of the Invention

The invention relates generally to clustered storage systems and more specifically is related to improved methods and structure for shipping I/O requests between storage controllers of the clustered storage system.

2. Related Patents

This patent application is related to the following commonly owned U.S. patent applications, all filed on the same date herewith and all of which are herein incorporated by reference:

- U.S. patent application Ser. No. 13/432,131, entitled METHODS AND STRUCTURE FOR TASK MANAGEMENT IN STORAGE CONTROLLERS OF A CLUSTERED STORAGE SYSTEM;
- U.S. patent application Ser. No. 13/432,213, entitled METHODS AND STRUCTURE FOR DIRECT PASS THROUGH OF SHIPPED REQUESTS IN FAST PATH CIRCUITS OF A STORAGE CONTROLLER IN A CLUSTERED STORAGE SYSTEM;
- U.S. patent application Ser. No. 13/432,223, entitled METHODS AND STRUCTURE FOR LOAD BALANCING OF BACKGROUND TASKS BETWEEN STORAGE CONTROLLERS IN A CLUSTERED STORAGE ENVIRONMENT;
- U.S. patent application Ser. No. 13/432,225, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;
- U.S. patent application Ser. No. 13/432,232, entitled METHODS AND STRUCTURE FOR IMPLEMENTING LOGICAL DEVICE CONSISTENCY IN A CLUSTERED STORAGE
- U.S. patent application Ser. No. 13/432,220, entitled METHODS AND STRUCTURE FOR MANAGING VISIBILITY OF DEVICES IN A CLUSTERED STORAGE SYSTEM;
- U.S. patent application Ser. No. 13/432,150, entitled METHODS AND STRUCTURE FOR IMPROVED BUFFER ALLOCATION IN A STORAGE CONTROLLER; and
- U.S. patent application Ser. No. 13/432,138, entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

Figure 1:
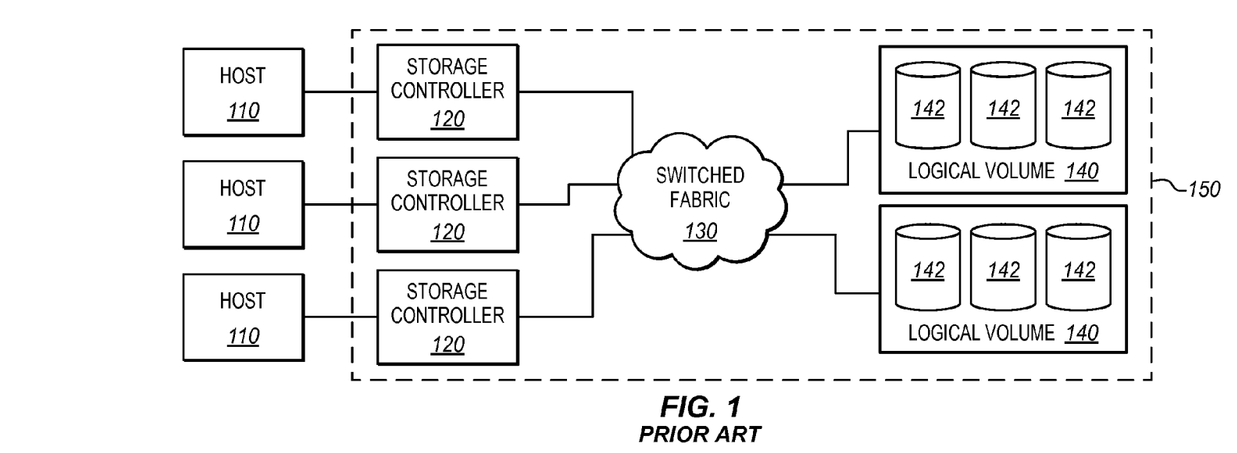
FIG. 1 is a block diagram illustrating an example of a prior art clustered storage system.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

Figure 2:
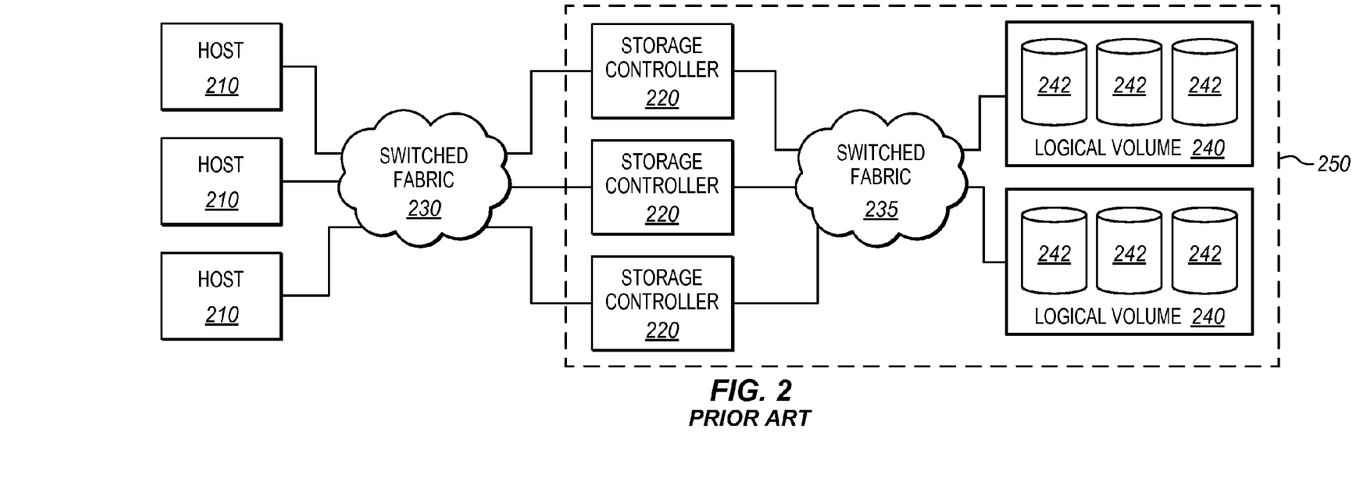
FIG. 2 is a block diagram illustrating another example of a prior art clustered storage system.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

In the clustered storage system environment, a host system may direct I/O requests to any logical volume of the clustered system. However, a host that is tightly coupled with a storage controller may direct all I/O requests only to that storage controller (i.e., where, as in the configuration of FIG. 1, the storage controller is integral with a single host system—e.g., an HBA in that host system). The storage controller must determine whether it or another storage controller in the system owns the logical volume to which the request is directed. Or, where a host is coupled through a switched fabric to all storage controllers of the system (as in the configuration of FIG. 1) a host may direct an I/O request to a controller that it understands is the owner of the logical volume. However, based on communications among the storage controllers, ownership of an addressed logical volume may have changed (e.g., for load balancing or as a result of a fail over of another storage controller). The host may have directed the I/O request to a storage controller that no longer owns the addressed logical volume if the host has not yet been notified of such a change of ownership.

In some prior techniques, the controller receiving the I/O request directed to a logical volume that it does not own processes the request to generate low level I/O requests to the affected physical storage devices. The low level I/O requests so generated may be performed by the controller (since all controllers are coupled with all storage devices in the clustered architecture). However, this requires complex coordination with another storage controller that presently owns the addressed logical volume. In other prior techniques, the controller receiving the I/O request would generate the lower level I/O operations directed to the affected physical storage devices but then ship those lower level physical device requests to another controller that owns the addressed logical volume. The other storage controller would process the lower level I/O in coordination with its management of the addressed logical volume that it owns. Where the original I/O request was for writing data to the logical volume, the first controller would receive the data from the requesting host and forward that data to the other controller as part of the lower level I/O operations shipped across. In the case of a read request, the other controller would perform the lower level read operations and return data to the first controller that, in turn, returned the requested data to the requesting host system. Or, in the case of a write request, the first controller (in receipt of the request directed to a logical volume) would receive the write data from the host system and forward that data to the second controller along with the lower level write operations. In other prior techniques, the controller receiving the I/O request would generate lower level operations only then to realize that the resources for those lower level operations were owned by another controller. Responsive to such a determination, the controller would simply discard the work that had been completed to decompose the logical volume request into corresponding lower level requests and ship the original logical volume request to the other controller (thus requiring duplication of the computational efforts to decompose the logical volume request on the other controller). These prior techniques result in significant processing in both the first controller that received the request and in the other controller that actually performs the required lower level I/O operations. Further, these prior techniques could "double buffer" the data associated with the original request by storing the related data locally and then forwarding the data to the intended recipient thus adding still further processing as well as memory requirements in the first controller.

Thus it is an ongoing challenge to process I/O requests in a storage controller of a clustered storage system by shipping aspects of the received request to another storage controller where ownership of logical volume may be transferred among the controllers.

SUMMARY

The present invention solves the above and other problems, thereby advancing the state of the useful arts, by providing methods and associated structure for improved shipping of I/O requests among multiple storage controllers of a clustered storage system. Minimal processing of a received I/O request is performed in a first controller that receives a host system I/O request to determine whether the I/O request is directed to a logical volume that is owned by the first controller or to a logical volume owned by another controller. For requests to a logical volume owned by another controller, the original I/O request is modified to indicate the target device address of the other controller. The first controller then ships the request to the other controller and configures DMA capabilities of the first controller to exchange data associated with the shipped request between the other controller and memory of the host system.

In one aspect hereof, a clustered storage system is provided. The clustered storage system comprising a first storage controller adapted to receive an I/O request from an attached host system and adapted to couple with a plurality of physical storage devices on which a logical volume is configured. The system further comprising a second storage controller coupled with the first storage controller and coupled with the plurality of storage devices, wherein the second storage controller owns the logical volume. The first storage controller is adapted to detect that the received I/O request is directed to the logical volume and is further adapted to transmit the received I/O request as a modified I/O request to the second storage controller responsive to the detection. The modified I/O request comprises a modified destination address corresponding to the second storage controller. The second storage controller is adapted to process the modified I/O request by accessing affected storage devices of the plurality of physical storage devices based on a configuration of the logical volume. The second storage controller exchanges data associated with the modified I/O request with the host system through the first storage controller.

Another aspect hereof provides method for I/O request shipping between storage controllers in a clustered storage system comprising a plurality of storage controllers. The method ships I/O requests between the storage controllers. The method comprises receiving in a first storage controller an I/O request from an attached host system. The request is directed to a logical volume identified in the received I/O request and is addressed to the first storage controller using a first target device address. The method then detects that the logical volume is owned by a second storage controller wherein the second storage controller is identified by a second target device address. The method then generates a modified I/O request based on the received I/O request. Generation of the modified I/O request comprises replacing the first target device address with the second target device address. The method then transmits the modified I/O request to the second storage controller for processing therein.

Still another aspect hereof provides a storage controller operable in a clustered storage system. The storage controller comprises ownership detection logic adapted to detect that an I/O request received from an attached host system is directed to a logical volume owned by another storage controller of the clustered storage system. The storage controller is coupled with one or more other storage controllers of the clustered storage system. The controller further comprises request shipping logic communicatively coupled with the ownership detection logic to receive the I/O request. The request shipping logic is adapted to generate a modified I/O request based on the I/O request. The modified I/O request is a copy of the I/O request modified to address a target device address associate with said other storage controller. The control further comprises an inter-controller interface circuit communicatively coupled with the request shipping logic and adapted to couple the storage controller with said other storage controller. The inter-controller interface circuit has direct memory access (DMA) capability to access memory in the host system. The request shipping logic is adapted to transmit the modified I/O request to said other storage controller through the inter-controller interface circuit. The inter-controller interface circuit is adapted to transfer data associated with the modified I/O request between the memory of the host system and said other controller using the DMA capability.

DETAILED DESCRIPTION OF THE DRAWINGS

Figure 3:
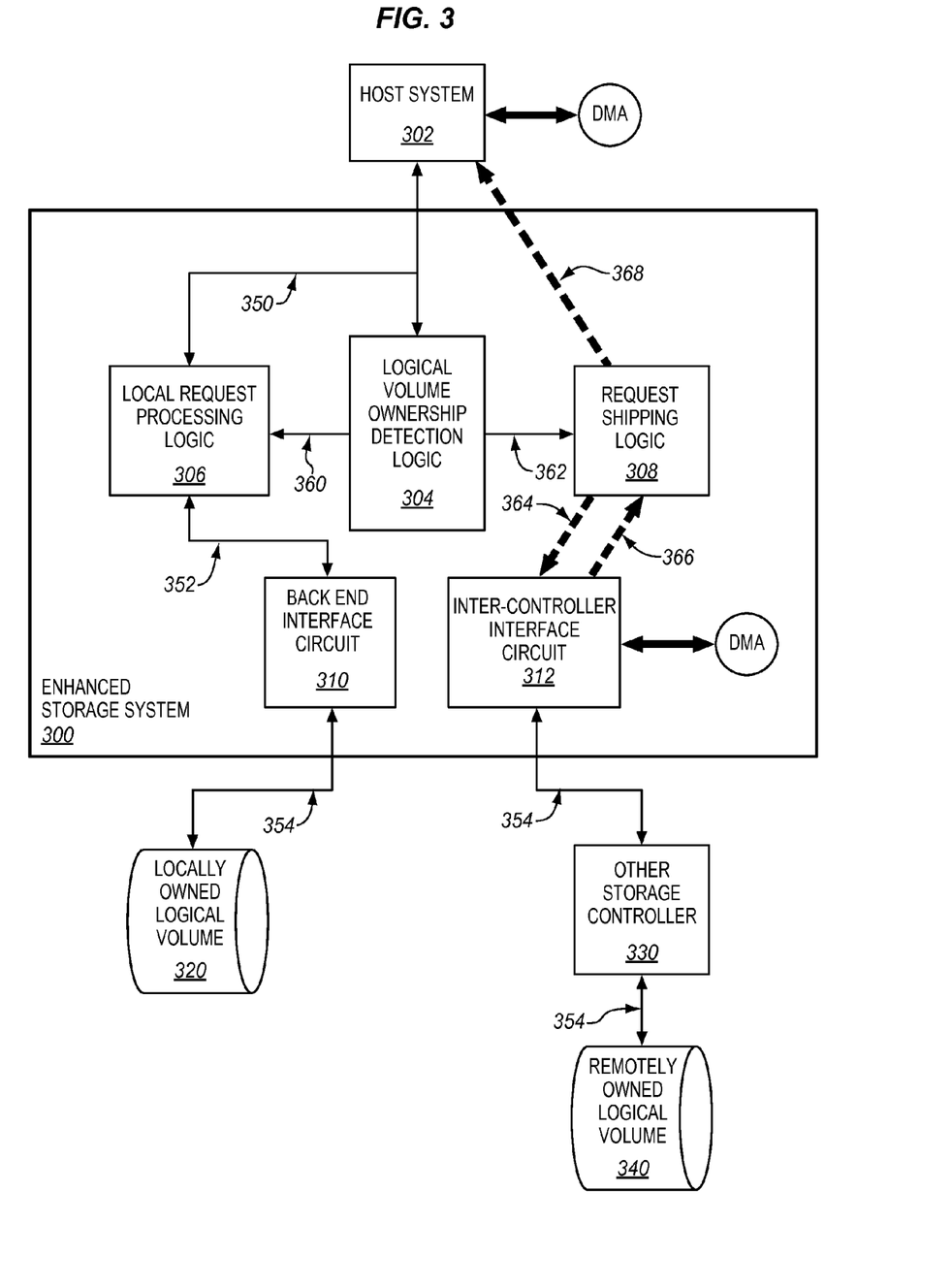
FIG. 3 is a block diagram of an exemplary embodiment of a storage controller enhanced in accordance with features and aspects hereof to improve performance of the storage controllers when shipping a request from a first controller to a second controller of a clustered storage system.

FIG. 3 is a block diagram of an exemplary enhanced storage controller 300 adapted to improve performance in shipping of a received I/O request to another controller (330). Enhanced storage controller 300 may be operable within a clustered storage system such as the systems of FIGS. 1 and 2. Enhanced storage controller 300 is adapted to couple with one or more host systems 302 through path 350. As discussed above with respect and FIGS. 1 and 2, storage controller 300 may be coupled with host systems 302 through any suitable communication media and protocols. In a preferred embodiment as discussed further herein below, an interface 350 between enhanced storage controller 300 and host system 302 comprises a memory mapped bus structure that permits the storage controller to utilize direct memory access (DMA) capabilities to exchange data with host system 302. For example, Peripheral Component Interconnect (PCI), PCI Express, Processor Local Bus (PLB) of the PowerPC architecture (e.g., PPC-PLB), AMBA AHB of the ARM architecture, etc. may provide such a memory mapped interface architecture with DMA capabilities to permit direct access by controller 300 to memory of host system 302. In general, in the case of PCI, AHB, or PLB bus structures, storage controller 300 may be implemented as a host bus adapter (HBA) inserted into an appropriate "backplane" connector coupling the HBA to a communication bus within host system 302. In the case of PCI Express connectivity between the controller and the host system, controller 300 may couple with a plurality of host systems through a PCI Express switched fabric providing direct memory access capabilities.

Storage controller 300 comprises back end interface circuit 310 for coupling controller 300 with one or more storage devices provisioning one or more locally owned logical volumes 320. Logical volume 320 comprises a logical device provisioned on one or more storage devices coupled with controller 300 via communication path 354. Controller 300 further comprises inter-controller interface circuit 312 adapted to couple controller 310 to other storage controllers 330 of the clustered storage system. Controller 300 may be coupled with other storage controller 330 via communication path 354. Other storage controller 330 may, in turn, be coupled with one or more remotely owned logical volumes 340 via communication path 354. In the exemplary embodiment of FIG. 3, communication path 354 represents any suitable communication media and protocol for coupling controller 300 with locally owned logical volumes 320, with other storage controllers 330, and for coupling all controllers (300 and 330) with all of the physical storage devices that provision all logical volumes (320 and 340) of the clustered storage system. Communication path 354 may comprise a switched fabric communication medium such as, for example, SAS, Fibre Channel, Ethernet, etc. As discussed above, in the context of a clustered storage system, only a corresponding single storage controller of the multiple controllers of the cluster presently has "ownership" of each logical volume to process I/O requests direct to the logical volume from within the clustered storage system. Thus, an I/O request received by controller 300 from host system 302 directed to logical volume 340 may be shipped to other storage controller 330 for processing (i.e., shipped to the other storage controller that presently owns the logical volume).

Those of ordinary skill in the art will recognize that back end interface 310 and inter-controller interface 312 may be portions of a common circuit. For example, each circuit (310 and 312) may be a portion of a SAS interface circuit such that 310 represents the first PHY/port coupled with the SAS domain (i.e., coupled with SAS switched fabric 354) and inter-controller interface circuit 312 represents another PHY/port coupled with the SAS domain. Or, for example, circuits 310 and 312 may utilize a common SAS PHY/port for accessing any components of the SAS domain.

In accordance with features and aspects hereof, controller 300 further comprises logical volume ownership detection logic 304 to receive and initially process an I/O request received from attached host system 302. Before performing any further processing on the received I/O request, logical volume ownership detection logic 304 determines whether the received I/O request is directed to locally owned logical volume 320 or instead is directed to remotely owned logical volume 340 (remotely owned with respect to controller 300 in receipt of the I/O request—locally owned by other controller 330). If the received request is directed to locally owned logical volume 320, the request is forwarded via path 362 to local request processing element 306 for standard processing of a received I/O request. Such normal processing comprises element 306 communicating with host system 302 via path 350 and with locally owned logical volume 320 via path 352, back end interface circuit 310, and path 354. Details of such normal I/O request processing are well known to those of ordinary skill in the art and thus beyond the scope of this discussion.

If detection logic 304 determines that the received I/O request is directed to remotely owned logical volume 340, the received request is applied to request shipping logic 308 via path 362. Request shipping logic 308 is adapted to generate a modified I/O request by essentially copying the received I/O request and modifying the copy of the request to alter the destination target device address. Rather than the target device address of storage controller 300 in the received I/O request, the modified request redirects the request to the destination target device address associated with other storage controller 330. Request shipping logic 308 then transmits the modified I/O request to other storage controller 330 via inter-controller interface circuit 312 and path 354 as indicated by thicker, bolded, dashed arrow 364.

The modified I/O request generally comprises either a read request or a write request and hence has data associated with the request. For example, in the case of a write request, associated write data will be forthcoming from host system 302 directed to storage controller 300 which, in turn, will forward the write data to other storage controller 330. Or, for example, in the case of a read request, associated data retrieved from remotely owned logical volume 340 by operation of other storage controller 330 will be returned through inter-controller interface circuit 312 to host system 302. In accordance with features and aspects hereof, all such data transfers between other storage controller 330 and host system 302 pass through controller 300 utilizing DMA capabilities of inter-controller interface circuit 312 of controller 300 to directly access memory of host system 302. As noted above, in a preferred exemplary embodiment, host system 302 couples with storage controller 300 utilizing any of a variety of memory mapped I/O bus structures (e.g., PCI, PCI Express, PPC-PLB, AMBA AHB, etc.). Thus, write data associated with a modified I/O request will be transferred from a memory of host system 302 via DMA into inter-controller interface circuit 312 for forwarding to other storage controller 330 via path 354. Or, for example, read data retrieved from remotely owned logical volume 340 by other storage controller 330 will be received in inter-controller interface circuit 312 and forwarded utilizing its DMA capabilities for storage in a memory of host system 302 directly by the DMA operation. Such DMA operations are depicted in FIG. 3 as thicker, solid, bold arrows coupling the "DMA" label between host system 302 and inter-controller interface circuit 312. It will be understood that the DMA capabilities of inter-controller interface circuit 312 obviate the need to further buffer within controller 300 data to be exchanged between other controller 330 and host system 302. Rather, data retrieved via DMA from host system 302 by circuit 312 is forwarded to other controller 330 and data received from other controller 330 by circuit 312 is forwarded to host system 302—all without the need for another intermediate buffer to be used within controller 300.

Eventually, other storage controller 330 completes processing of the modified I/O request shipped to it by storage controller 300. Responsive to such completion, other storage controller 330 returns a completion status message to inter-controller interface circuit 312 (via path 354). The completion status message is then forwarded back to host system 302 through request shipping logic 308 (as indicated by thicker dashed lines 366 and 368).

In some exemplary embodiments, logic elements 304, 306, and 308 may be implemented as suitably programmed instructions executed by one or more general or special purpose processors of controller 300. In other exemplary embodiments, such logic may be implemented as suitably designed custom logic circuits. Still other embodiments may utilize combinations of programmed instructions and custom designed logic circuits. Significant performance improvement is achieved in the enhanced controller of FIG. 3 by performing less processing of an I/O request to be shipped to another controller as compared to prior designs. Further performance improvements are realized by use of DMA capabilities in controller 300 for transferring data between the other storage controller and the memory of the host system without requiring intermediate buffering within memory of storage controller 300. Rather, data is transferred between other controller 330 and memory of host system 302 directly using DMA capabilities of circuit 312 of controller 300. An exemplary interface circuit that includes such DMA capabilities is an LSI 2108 and 2208. Such circuits may also be integrated into RAID controller products such as the LSI MegaRAID 9280 and 9285 RAID controllers.

Those of ordinary skill in the art will recognize numerous additional and equivalent elements that may be present in a fully functional storage controller and clustered storage system. Such additional and equivalent elements are omitted herein for simplicity and brevity of this discussion.

Figure 4:
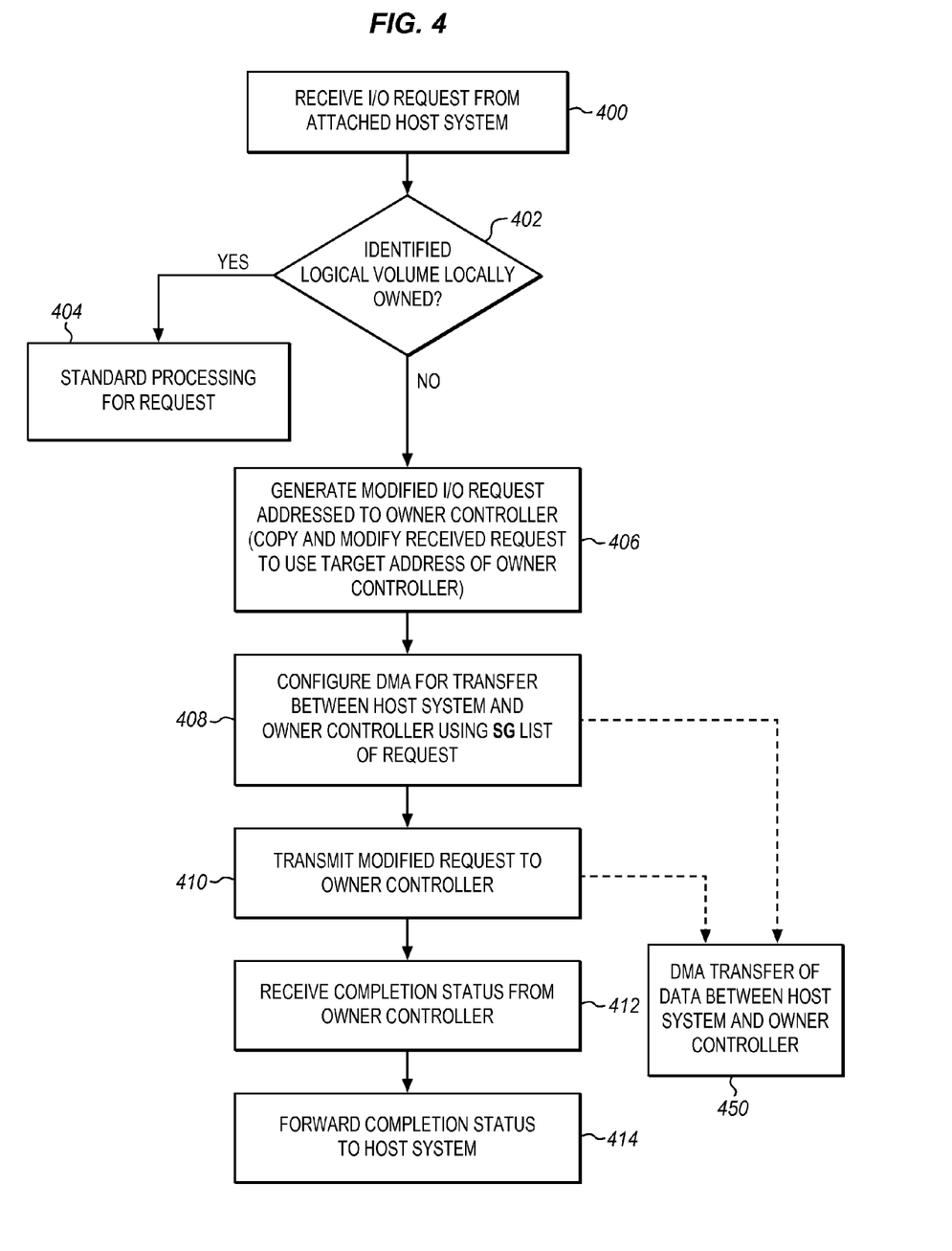
FIG. 4 is a flowchart describing an exemplary method in accordance with features and aspects hereof to ship a request from a first controller to a second controller of a clustered storage system.

FIG. 4 is a flowchart describing an exemplary method for improving performance of I/O request shipping in a clustered storage system. The method of FIG. 4 may be operable in an enhanced storage controller of a clustered storage system such as the controller of FIG. 3 and the systems of FIGS. 1 through 3. More specifically, the method of FIG. 4 may be performed by logic elements within an enhanced storage controller in conjunction with an intelligent inter-controller interface circuit of the controller (e.g., logic 308 and circuit 312 of controller 300). The logic elements are adapted to program the inter-controller interface circuit to exchange data between another controller (processing a shipped request) and memory of the requesting host controller using DMA capabilities of the inter-controller interface circuit of the enhanced storage controller. At step 400, an I/O request is received from an attached host system. The I/O request is addressed to the target device address of the enhanced controller and indicates a request to access an identified logical volume of the clustered storage system. Ownership detection logic of the enhanced controller then determines at step 402 whether the received request is directed to a logical volume that is owned by this controller or rather is directed to a logical volume that is owned by another storage controller of the clustered storage system. If the logical volume to which the received request is directed is to a logical volume that is locally owned (i.e., by this controller), then step 404 performs all normal processing of the received I/O request within this controller—i.e., within the controller that received the request. Such normal processing may be performed by a suitably programmed general or special purpose processor of the controller, by suitably designed customer circuits, or by combinations of programmed instructions and custom designed circuits. Details of such normal processing of a received request are well known to those of ordinary skill in the art and thus are omitted herein for simplicity and brevity of this discussion.

If step 402 determines that the logical volume identified in the received request is owned by another controller of the clustered storage system, step 406 next generates a modified I/O request (e.g., by operation of the request shipping logic of the enhanced controller). The modified request is generated by copying the originally received request and modifying the target device address in the copy to a target device address associated with the other controller that is determined to own the identified logical volume. In this configuration, this controller (preparing to ship the request to another controller) will become an "initiator controller" in communicating (shipping) the modified I/O request to the other controller while the other controller will be a "target controller" for the modified request being shipped.

Step 408 within the shipping logic of the enhanced controller next configures the DMA capabilities of the controller to prepare to transfer data associated with the modified request between the host system and the other controller. More specifically, request shipping logic of the enhanced controller configures DMA features of the inter-controller interface circuit to transfer data associated within the request directly between memory of the requesting host system and the second/other storage controller (through the inter-controller interface circuit of the initiator controller). The dashed line from step 408 to step 450 indicates the preparation of the DMA features of the inter-controller interface circuit to provide such DMA transfers of data between the other controller and memory of the host system. Step 410 then transmits the modified I/O request to the other controller (the controller that owns the logical volume identified in the I/O request). The dashed line connection of step 410 and step 450 indicates that the DMA features configured by step 408 are started to perform the requisite transfer of data associated with the modified I/O request between the other controller and the memory of the host system. The DMA capabilities may be configured to operate in accordance with a scatter-gather list provided by the host system in the original I/O request. The scatter-gather list entries defined locations in the host system memory for data associated with the I/O request (i.e., locations from which write data may be retrieved or locations in which read data may be stored). Further, a scatter-gather list entry may comprise a "chain" entry that points to further scatter-gather list entries. Thus the scatter-gather list entries of the chain element may themselves be retrieved by a DMA transfer.

When the other controller completes processing of the modified I/O request (including exchange of data with the host system through the DMA features of the enhanced controller), a completion status is returned from the other controller to the enhanced controller at step 412. The completion status so returned to the enhanced (initiator) controller is then forwarded to the requesting host system.

Those of ordinary skill in the art will recognize numerous additional and equivalent steps in a fully functional method such as the method of FIG. 4. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A clustered storage system comprising:
   a first storage controller adapted to receive an I/O request from an attached host system and adapted to couple with a plurality of physical storage devices on which a logical volume is configured; and
   a second storage controller coupled with the first storage controller and coupled with the plurality of storage devices, wherein the second storage controller owns the logical volume,
   wherein the first storage controller is adapted to detect that the received I/O request is directed to the logical volume and is further adapted to transmit the received I/O request as a modified I/O request to the second storage controller responsive to the detection, wherein the modified I/O request comprises a modified destination address corresponding to the second storage controller,
   wherein the second storage controller is adapted to process the modified I/O request by accessing affected storage devices of the plurality of physical storage devices based on a configuration of the logical volume, and
   wherein the second storage controller exchanges data associated with the modified I/O request with the host system through the first storage controller.

2. The system of claim 1
   wherein the second storage controller is adapted to return a completion status to the first storage controller indicating a status of completion of processing of the modified I/O request, and
   wherein the first storage controller is adapted to return the received completion status to the attached host system.

3. The system of claim 1
   wherein the first storage controller comprises a first inter-controller interface circuit for coupling with the second storage controller, the first inter-controller interface circuit having direct memory access (DMA) capability for access to memory of the host system,
   wherein the first storage controller is adapted to generate the modified I/O request by copying the received I/O request and modifying a destination address in the modified I/O request to a destination address of the second storage controller, wherein the received I/O request comprises DMA scatter-gather list indicating addresses in a memory of the host system for data associated with the received I/O request, and
   wherein the first storage controller is adapted to utilize the DMA scatter-gather list with the DMA capability of the first inter-controller interface circuit to transfer data relating to the modified I/O request between the memory of the host system and the second storage controller.

4. The system of claim 3
   wherein the first storage controller comprises a control circuit for managing operation of the first storage controller, the control circuit coupled with the first inter-controller interface circuit,
   wherein the control circuit is adapted to configure the DMA capability of the first inter-controller interface circuit to transfer data relating to the modified I/O request between the memory of the host system and the second storage controller, wherein the data is transferred in accordance with the scatter-gather list.

5. The system of claim 4
   wherein the first inter-controller interface circuit comprises a circuit adapted to couple with a switched fabric communication medium,
   wherein a second inter-controller interface circuit of the second storage controller comprises a circuit adapted to couple with a switched fabric communication medium, and
   wherein the system further comprises:
   a switched fabric communication medium coupling the first inter-controller interface circuit with the second inter-controller interface circuit.

6. The system of claim 4
   wherein the first inter-controller interface circuit comprises a serial attached SCSI (SAS) interface circuit.

7. The system of claim 6 further comprising:
   a SAS switched fabric coupling the first inter-controller interface circuit with the second inter-controller interface circuit.

8. The system of claim 6
   wherein the first storage controller is adapted to couple with the host system using one or more of: PowerPC processor local bus (PPC-PLB), peripheral component interconnect (PCI), and PCI Express.

9. The system of claim 4
   wherein the DMA scatter-gather list comprises an entry that points to further scatter-gather list entries in the host system, wherein the control circuit configures the interface circuits to transfer data in accordance with the scatter-gather list and in accordance with the further scatter-gather list entries.

10. A method for I/O request shipping between storage controllers, the method operable in a clustered storage system comprising a plurality of storage controllers, the method for shipping I/O requests between the storage controllers, the method comprising:

receiving in a first storage controller an I/O request from an attached host system, the request directed to a logical volume identified in the received I/O request, the request addressed to the first storage controller using a first target device address;

detecting that the logical volume is owned by a second storage controller wherein the second storage controller is identified by a second target device address;

generating a modified I/O request based on the received I/O request, wherein generation of the modified I/O request comprises replacing the first target device address with the second target device address; and transmitting the modified I/O request to the second storage controller for processing therein.

11. The method of claim 10 further comprising:

receiving completion status within the first storage controller from the second storage controller indicating completion of the modified I/O request within the second storage controller; and forwarding the completion status from the first storage controller to the host system.

12. The method of claim 10
wherein the modified I/O request comprises a direct memory access (DMA) scatter-gather list copied from the received I/O request, the DMA scatter-gather list indicating addresses in a memory of the host system for data associated with the received I/O request, the method further comprising:

transferring data associated with the modified I/O request between the host system and the second storage controller through the first storage controller utilizing DMA capabilities of the first storage controller, wherein the transfer is in accordance with the DMA scatter-gather list.

13. The method of claim 12
wherein the step of transferring data further comprises:

configuring a DMA circuit of the first storage controller to transfer data between the second storage controller and the memory of the host system by DMA transfer based on the DMA scatter-gather list.

14. The method of claim 13
wherein the DMA scatter-gather list comprises an entry that points to further scatter-gather list entries in the host system, wherein the step of configuring further comprises configuring the DMA circuit to transfer data in accordance with the scatter-gather list and in accordance with the further scatter-gather list entries.

15. A storage controller operable in a clustered storage system, the storage controller comprising:

ownership detection logic adapted to detect that an I/O request received from an attached host system is directed to a logical volume owned by another storage controller of the clustered storage system, wherein the storage controller is coupled with said other storage controller;

request shipping logic communicatively coupled with the ownership detection logic to receive the I/O request and adapted to generate a modified I/O request based on the I/O request, wherein the modified I/O request is a copy of the I/O request modified to address a target device address associated with said other storage controller; and an inter-controller interface circuit communicatively coupled with the request shipping logic and adapted to couple the storage controller with said other storage controller, the inter-controller interface circuit having direct memory access (DMA) capability to access memory in the host system, wherein the request shipping logic is adapted to transmit the modified I/O request to said other storage controller through the inter-controller interface circuit, wherein the inter-controller interface circuit is adapted to transfer data associated with the modified I/O request between the memory of the host system and said other controller using the DMA capability.

16. The storage controller of claim 15
wherein the inter-controller interface circuit is adapted to receive a completion status from said other controller indicating completion of processing of the modified I/O request and is further adapted to return the completion status to the host system.

17. The storage controller of claim 15
wherein the request shipping logic is further adapted to configure the DMA capability of the inter-controller interface circuit to transfer the data between the memory of the host system and said other storage controller.

18. The storage controller of claim 17
wherein the I/O request comprises a DMA scatter-gather list, and wherein the inter-controller interface circuit is further adapted to transfer the data in accordance with the DMA scatter-gather list.

19. The storage controller of claim 18
wherein the DMA scatter-gather list comprises an entry that points to further scatter-gather list entries in the host system, wherein the inter-controller interface circuit is further adapted to transfer the data in accordance with the scatter-gather list and in accordance with the further scatter-gather list entries.

* * * * *